United States Patent
Ooshima et al.

(10) Patent No.: US 7,416,685 B2
(45) Date of Patent: Aug. 26, 2008

(54) FLUORESCENT MATERIAL AND FLUORESCENT DISPLAY APPARATUS

(75) Inventors: Hidenori Ooshima, Nagoya (JP); Fuyutoshi Sato, Nagoya (JP); Shunichi Kubota, Sendai (JP)

(73) Assignee: Noritake Co., Limited, Nagoya (JP)

( * ) Notice: Subject to any disclaimer, the term of this patent is extended or adjusted under 35 U.S.C. 154(b) by 601 days.

(21) Appl. No.: 11/086,750

(22) Filed: Mar. 23, 2005

(65) Prior Publication Data
US 2005/0218782 A1   Oct. 6, 2005

(30) Foreign Application Priority Data
Mar. 30, 2004   (JP) .............. 2004-097738

(51) Int. Cl.
*C09K 11/55* (2006.01)
*C09K 11/67* (2006.01)

(52) U.S. Cl. .............................. 252/301.4 F
(58) Field of Classification Search ......... 252/301.4 F; 313/486
See application file for complete search history.

(56) References Cited

U.S. PATENT DOCUMENTS

| | | | | |
|---|---|---|---|---|
| 3,557,014 A | * | 1/1971 | Beals et al. ........... | 252/301.4 F |
| 5,619,098 A | * | 4/1997 | Toki et al. ............. | 313/496 |
| 5,650,094 A | * | 7/1997 | Royce et al. .......... | 252/301.4 F |
| 6,669,868 B2 | * | 12/2003 | Yu et al. ............... | 252/301.4 F |
| 6,818,154 B2 | * | 11/2004 | Yu et al. ............... | 252/301.4 F |
| 6,828,718 B2 | * | 12/2004 | You et al. ............. | 313/486 |

FOREIGN PATENT DOCUMENTS

| JP | A 8-85788 | 4/1996 |
|---|---|---|
| JP | A 2003-41246 | 2/2003 |

OTHER PUBLICATIONS

A. Vecht et al.; "New electron excited light emitting materials"; J. Vac.Sci. Technol. B 12(2), Mar./Apr. 1994 pp. 781-784.
P.T. Diallo et al.; "Improvement of the optical performance of $Pr^{3+}$ in $CaTiO_3$"; Journal of Alloys and Compounds 323-324 (2001) pp. 218-222.
Seound-Youl Kang et al.; "The Influence of Li Addition on Cathodoluminescence for $CaTiO_3$:$Pr^{3+}$"; Eurodisplay 2002 pp. 777-779.

* cited by examiner

*Primary Examiner*—C. Melissa Koslow
(74) *Attorney, Agent, or Firm*—Oliff & Berridge, PLC (57) ABSTRACT

A $CaTiO_3$:Pr,M fluorescent material including 100 mol % of calcium titanate $CaTiO_3$ as a host crystal; from 0.003 mol % to 0.05 mol % of praseodymium Pr which is added, as a first additive, to the host crystal; and at least one of aluminum Al, gallium Ga, indium In, zinc Zn, magnesium Mg, sodium Na, and potassium K which is added, as a second additive M, to the host crystal.

10 Claims, 8 Drawing Sheets

FLUORESCENT MATERIAL AND FLUORESCENT DISPLAY APPARATUS

The present application is based on Japanese Patent Application No. 2004-097738 filed on Mar. 30, 2004, the contents of which are incorporated herein by reference.

BACKGROUND OF THE INVENTION

1. Field of the Invention

The present invention relates to a fluorescent material and a fluorescent display apparatus including the fluorescent material as a light source.

2. Discussion of Related Art

There has conventionally been known a $Zn_{1-x}Cd_xS$ fluorescent material (hereinafter, referred to as the ZnCdS fluorescent material) which is used as a red-light emitting fluorescent material that is excited by a low-voltage electron beam and is employed by a fluorescent display device such as a vacuum fluorescent display (VFD). However, recently, the use of harmful elements such as cadmium Cd is restricted in view of environmental quality, and the ZnCdS fluorescent material is subject to that restriction. In addition, if the ZnCdS fluorescent material as a sulfide is decomposed by its exposure to the electron beam, then the sulfur S scattered from the sulfide may lower an electron emitting capability of an oxide cathode as the source of electrons. As far as the present application is concerned, the "low-voltage electron beam" is defined as an electron beam that is accelerated by an electric voltage of from about 10 V to about 100 V that is preferable for VFD, unless otherwise defined.

In the above-indicated background, there has been proposed an oxide fluorescent material that does not contain cadmium Cd or sulfur S and emits a red light in response to a low-voltage electron beam. More specifically described, the oxide fluorescent material contains, as a host crystal an oxide of an alkaline earth metal and titanium Ti, and a rare earth element and a group-3 element each as an additive. The alkaline earth metal may be magnesium Mg, strontium Sr, calcium Ca, or barium Ba; the rare earth element may be cerium Ce, praseodymium Pr, europium Eu, terbium Tb, erbium Er, or thulium Tm; and the group-3 element may be aluminum Al, gallium Ga, indium In, or thallium Tl. A typical composition of the above-indicated oxide fluorescent material may be $SrTiO_3$:Pr,Al, as disclosed by Patent Document 1 (Japanese Patent Application Publication No. 8-85788) or Patent Document 2 (Japanese Patent Application Publication No. 2003-41246). Here, the elements Pr, Al on the right-hand side of the colon ":" indicate the components or elements added to strontium titanate $SrTiO_3$ as the host crystal. This composition preferably contains from 0.1 mol % to 2 mol % of praseodymium Pr and from 1 mol % to 50 mol % of aluminum, as taught by Patent Document 1.

In addition, there has also been proposed a $CaTiO_3$ fluorescent material as an example of a composition wherein the alkaline earth metal is calcium Ca, although this fluorescent material is not for use in VFD. The $CaTiO_3$ fluorescent material is disclosed by Non-Patent Document 1 (Vecht et al. "New electron excited light emitting materials" J. Vac. Sci. Technol. B 12(2), March/April 1994 p. 781-784), Non-Patent Document 2 (P. T. Diallo et al. "Improvement of the optical performances of $Pr^{3+}$ in $CaTiO_3$" Journal of Alloys and Compounds 323-324 (2001) p. 218-222), or Non-Patent Document 3 (Seung-Youl Kang et al. "The influence of Li Addition on Cathodoluminescence for $CaTiO_3$:$Pr^{+3}$" EURODISPLAY 2002 p. 777-779).

SUMMARY OF THE INVENTION

However, the $SrTiO_3$:Pr,Al fluorescent material disclosed by Patent Document 1 suffers from the problems of quick brightness deterioration and short life expectancy. Patent Document 2 discloses the technique of reducing the brightness deterioration by providing a protection layer made of the host compound or crystal, on surfaces of particles of the fluorescent material. However, notwithstanding the provision of the protection layer, the life expectancy of the $SrTiO_3$:Pr,Al fluorescent material is much shorter than that of the ZnCdS fluorescent material. In addition, even in the initial stage of use, the $SrTiO_3$:Pr,Al fluorescent material employing the protection layer exhibits a low brightness as compared with the ZnCdS fluorescent material.

In addition, if the $CaTiO_3$ fluorescent material disclosed by Non-Patent Documents 1, 2, and 3 is excited by a low-voltage electron beam, the $CaTiO_3$ fluorescent material emits a light whose brightness is at most about one tenth of a brightness of a light emitted by the ZnCdS fluorescent material Thus, the $CaTiO_3$ fluorescent material is not suitable for use in VFD.

It is therefore an object of the present invention to provide an oxide fluorescent material and a fluorescent display apparatus which can enjoy a longer life expectancy than that of the $SrTiO_3$:Pr,Al fluorescent material and can emit a light having a high brightness even when it is excited by a low-voltage electron beam. This object may be achieved by the present invention.

According to a first aspect of the present invention, there is provided a $CaTiO_3$:Pr,M fluorescent material comprising 100 mol % of calcium titanate $CaTiO_3$ as a host crystal; from 0.003 mol % to 0.05 mol % of praseodymium Pr which is added, as a first additive, to the host crystal; and at least one of aluminum Al, gallium Ga, indium In, zinc Zn, magnesium Mg, sodium Na, and potassium K which is added, as a second additive M, to the host crystal.

According to a second aspect of the present invention, there is provided a fluorescent display apparatus comprising, as a light source, the $CaTiO_3$:Pr,M fluorescent material in accordance with the first aspect of the present invention.

In the $CaTiO_3$:Pr,M fluorescent material in accordance with the first aspect of the present invention, from 0.003 mol % to 0.05 mol % of praseodymium Pr is added, as an activator, to calcium titanate $CaTiO_3$ as the host crystal, and moreover at least one element M selected from aluminum Al, gallium Ga, indium In, zinc Zn, magnesium Mg, sodium Na, and potassium K is added. Thus, an oxide fluorescent material that can enjoy a longer life expectancy than that of a conventional $SrTiO_3$:Pr,Al fluorescent material and can emit a light having a high brightness even when it is excited by a low-voltage electron beam, is obtained. More specifically described, since the amount of praseodymium Pr added falls in the above-indicated range and this element Pr is used with, e.g., aluminum Al as another activator, the $CaTiO_3$:Pr,M fluorescent material can emit a light having a high brightness even if it may be excited by a low-voltage electron beam, whereas a conventional $CaTiO_3$ fluorescent material cannot emit a light having a high brightness unless it is excited by a high-voltage electron beam or an ultraviolet ray. In addition, the present $CaTiO_3$:Pr,M fluorescent material is not deteriorated so much as the $SrTiO_3$:Pr,Al fluorescent material is. For example, the present $CaTiO_3$:Pr,M fluorescent material can emit a light having a brightness twice or more higher than that of a conventional $CaTiO_3$ fluorescent material containing 0.1 mol % of praseodymium Pr. Meanwhile, in the case where the amount of praseodymium Pr added is less than 0.003 mol % or more than 0.05 mol %, the brightness of light emitted by the CaTiO$_3$:Pr,M fluorescent material exited by the low-voltage electron beam remains significantly lower than that of the light emitted by the conventional sulfide fluorescent material, although a high brightness may be obtained if the CaTiO$_3$:Pr,M fluorescent material is excited by a high-voltage electron beam of not lower than 1 kV, or an ultraviolet ray.

The reason why the above-indicated high brightness is obtained is speculated as follows: If the concentration of praseodymium Pr is too high, the brightness decreases because of so-called "concentration quenching"; and as the concentration decreases, the effect of concentration quenching decreases and accordingly the brightness increases. On the other hand, if the concentration of praseodymium Pr is too low, the number of light emission centers of the fluorescent material decreases and accordingly the brightness decreases. Thus, it can be speculated that in the CaTiO$_3$:Pr,M fluorescent material in accordance with the first aspect of the present invention, the optimum concentration range of praseodymium Pr wherein the number of light emission centers is sufficiently large and the concentration quenching is at a sufficiently low level is from 0.003 mol % to 0.05 mol %.

In addition, the reason why the CaTiO$_3$:Pr,M fluorescent material can enjoy the longer life expectancy than that of the SrTiO$_3$:Pr,Al fluorescent material can be speculated as follows: Under the condition that each of those fluorescent materials is being excited by an electron beam, a less amount of oxygen comes off the host crystal of the CaTiO$_3$:Pr,M fluorescent material than an amount of oxygen that comes off the host crystal of the SrTiO$_3$:Pr,Al fluorescent material. That is, a less amount of defects occurs to the crystal lattice of the CaTiO$_3$:Pr,M fluorescent material than an amount of defects that occurs to the crystal lattice of the SrTiO$_3$:Pr,Al fluorescent material. If the particles of each fluorescent material have the defects of crystal lattice, then the brightness of light emitted by the each fluorescent material would decrease. Thus, it can be speculated that since the less amount of oxygen comes off the CaTiO$_3$:Pr,M fluorescent material and accordingly the less amount of defects occurs to the same, the CaTiO$_3$:Pr,M fluorescent material enjoys the longer life expectancy than that of the SrTiO$_3$:Pr,Al fluorescent material.

The fluorescent display apparatus in accordance with the second aspect of the present invention employs, as the light source, the CaTiO$_3$:Pr,M fluorescent material in accordance with the first aspect of the present invention. Therefore, the fluorescent display apparatus can operate at a low voltage and enjoy a long life expectancy and a high emission-light brightness.

As far as the present application is concerned, the term "calcium titanate CaTiO$_3$" is defined as encompassing not only a compound having a stoichiometric composition wherein the ratio of calcium Ca to titanium Ti is equal to 1, but also compounds wherein the ratio is somewhat greater or smaller than 1, for example, the ratio falls in the range of from 1.05 to 0.95.

The fluorescent material in accordance with the first aspect of the present invention can exhibit a high brightness even when it is excited by a low-voltage electron beam that may be employed by VFD. However, the fluorescent material may be excited by a high-voltage electron beam of not less than 1 kV, or an ultraviolet ray, and emit a light. Thus, the fluorescent material can find other applications than the application wherein it is excited by the low-voltage electron beam. More specifically described, the fluorescent material of the present invention can be advantageously employed by FED (field emission display) wherein the fluorescent material is excited by an electron beam produced at an electric voltage of from about 1 kV to about 10 kV and emits a light; CRT (cathode ray tube) wherein the fluorescent material is excited by an electron beam produced at an electric voltage of about 10 kV and emits a light; or PDP (plasma display panel) wherein the fluorescent material is excited by an ultraviolet ray and emits a light. Thus, the fluorescent display apparatus in accordance with the second aspect of the present invention encompasses not only VFD (vacuum fluorescent display) but also FED, CRT, and PDP, so long as each of them employs, as the light source, the fluorescent material in accordance with the first aspect of the present invention.

Regarding the fluorescent material in accordance with the first aspect of the present invention, praseodymium Pr as the first additive added to calcium titanate CaTiO$_3$ as the host crystal can take 3+ or 4+ as its ion valence. However, it is praseodymium ion Pr$^{3+}$ that contributes to emitting a red light. The praseodymium ion Pr$^{3+}$ can replace, because of its ion radius, the site of calcium ion Ca$^{2+}$, but this replacement increases the electric charge by one because the valence of praseodymium Pr$^{3+}$ is one more than that of the valence of calcium ion Ca$^{2+}$. In order to balance the electric charge, the site of titanium ion Ti$^{4+}$ whose valence is 4+ may be replaced with a positive ion whose valence is 3+. Since each of aluminum ion Al$^{3+}$, gallium ion Ga$^{3+}$, and indium ion In$^{3+}$ that have the valence of 3+ can replace the site of titanium ion Ti$^{4+}$, one praseodymium ion Pr$^{3+}$ replacing one calcium ion Ca$^{2+}$ site can be electrically balanced by one aluminum, gallium, or indium ion Al$^{3+}$, Ga$^{3+}$, In$^{3+}$ replacing one titanium ion Ti$^{4+}$ site, and accordingly praseodymium ion Pr$^{3+}$ can be present in calcium titanate CaTiO$_3$ as the host crystal. In addition, it can be speculated that zinc ion Zn$^{2+}$ or magnesium ion Mg$^{2+}$ can replace, because of its ion radius, the site of titanium ion Ti$^{4+}$. However, since each of zinc ion Zn$^{2+}$ or magnesium ion Mg$^{2+}$ is a positive ion having a valence of 2+, the replacement decreases the electric charge by two. Therefore, when one zinc or magnesium ion Zn$^{2+}$, Mg$^{2+}$ replaces one titanium ion Ti$^{4+}$ site, the electric charge can be balanced by replacing, with two praseodymium ions Pr$^{3+}$, two calcium ions Ca$^{2+}$ sites. Moreover, lithium ion Li$^+$, sodium ion Na$^+$, or potassium ion K$^+$ can replace, because of its ion radius, the site of calcium Ca$^{2+}$. However, since each of lithium ion Li$^+$, sodium ion Na$^+$, and potassium ion K$^+$ is a positive ion having a valence of 1+, the replacement decreases the electric charge by one. Therefore, when one lithium, sodium or potassium ion Li$^+$, Na$^+$, K$^+$ replaces one calcium ion Ca$^{2+}$ site, the electric charge can be balanced by replacing, with one praseodymium ion Pr$^+$, one calcium ion Ca$^{2+}$ site. Thus, each of the second additives has the effect of stabilizing the praseodymium ions Pr$^{3+}$ and accordingly contributes to emitting a light having a higher intensity as compared with a fluorescent material wherein no such second additive is added. In the fluorescent material wherein no such second additive is added and only praseodymium Pr is added, a certain amount of calcium Ca comes off its crystal lattice so as to balance the electric charge, and accordingly a corresponding amount of defects occurs to the crystal lattice, thereby lowering the intensity of light emitted by the fluorescent material.

Here, preferably, the amount of praseodymium Pr added falls in a range of from 0.008 mol % to 0.023 mol %.

Also, preferably, the second additive includes from 0.1 mol % to 1.0 mol % of aluminum Al relative to 100 mol % of the host crystal Since the amount of aluminum Al added is appropriate, the fluorescent material can emit a light having a high brightness that is, e.g., not less than 50 cd/m$^2$, even when the fluorescent material may be excited by a low-voltage electron beam. More preferably, the amount of aluminum Al added falls in a range of from 0.2 mol % to 0.5 mol %. In the latter case, the fluorescent material can emit a light having a higher brightness that is, e.g., not less than 70 cd/m², even when the fluorescent material may be excited by the low-voltage electron beam. Generally, it is desirable that a fluorescent material emit a light having a not less than 50 cd/m² brightness that can be recognized with naked eyes, more desirably, a not less than 70 cd/m² brightness.

Also, preferably, the second additive includes not less than 0.07 mol % of gallium Ga relative to 100 mol % of the host crystal. Since the fluorescent material contains a sufficiently large amount of gallium Ga, the fluorescent material can emit a light having a high brightness that is, e.g., not less than 50 cd/m², even when the fluorescent material may be excited by the low-voltage electron beam.

Also, preferably, the second additive includes not less than 0.13 mol % of zinc Zn relative to 100 mol % of the host crystal. Since the fluorescent material contains a sufficiently large amount of zinc Zn, the fluorescent material can emit a light having a high brightness that is, e.g., not less than 50 cd/m², even when the fluorescent material may be excited by the low-voltage electron beam. More preferably, the amount of zinc Zn added is not less than 0.66 mol %. In the latter case, the fluorescent material can emit a light having a higher brightness that is, e.g., not less than 70 cd/m².

Also, preferably, the second additive includes not less than 0.07 mol % of magnesium Mg relative to 100 mol % of the host crystal. Since the fluorescent material contains a sufficiently large amount of magnesium Mg, the fluorescent material can emit a light having a high brightness that is, e.g., not less than 50 cd/m², even when the fluorescent material may be excited by the low-voltage electron beam. More preferably, the amount of magnesium Mg added is not less than 0.1 mol %. In the latter case, the fluorescent material can emit a light having a higher brightness that is, e.g., not less than 70 cd/m².

Also, preferably, the $CaTiO_3$:Pr,M fluorescent material further comprises not less than 0.5 mol % of lithium Li relative to 100 mol % of the host crystal. Since the fluorescent material can enjoy the respective brightness improving effects of (a) at least one of aluminum Al, gallium Ga, indium In, zinc Zn, magnesium Mg, sodium Na, and potassium K, and (b) lithium Li, the fluorescent material can emit a light having a higher brightness that is, e.g., not less than 70 cd/m², as compared with the fluorescent material wherein only one or more of aluminum Al, gallium Ga, indium In, zinc Zn, magnesium Mg, sodium Na, and potassium K is or are added.

Also, preferably, the $CaTiO_3$:Pr,M fluorescent material comprises a plurality of second additives M which are selected from the group consisting of aluminum Al, gallium Ga, zinc Zn, magnesium Mg, indium In, sodium Na, and potassium K and which are added together to the host crystal. In this case, it is desirable that the amount of each of the second additives added to the host crystal fall in the above-described range that is preferred when the each second additive is added solely.

The present invention also relates to a method of producing the $CaTiO_3$:Pr,M fluorescent material in accordance with the first aspect of the present invention, the method comprising the steps of a mixing step of mixing (a) a host-crystal raw material for providing the calcium titanate $CaTiO_3$ as the host crystal, (b) a first-additive raw material including praseodymium Pr, and (c) at least one second-additive raw material including at least one of aluminum Al, gallium Ga, indium In, zinc Zn, magnesium Mg, sodium Na, and potassium K, with each other, into a mixture, and a firing step of firing the mixture at a first pre-selected temperature in a range of from 1,050° C. to 1,250° C., more preferably in a range of from 1,050° C. to 1,200° C., most preferably in a range of from 1,100° C. to 1,150° C.

In this method, the host-crystal raw material, the first-additive raw material, and the second-additive raw material or materials are mixed with each other in the mixing step, and the thus obtained mixture is fired at the pre-selected temperature in the range of from 1,050° C. to 1,250° C., in the firing step. Therefore, the present method produces an oxide fluorescent material that can enjoy a long life expectancy and emits a light having a high brightness even when it may be excited by a low-voltage electron beam. More specifically described, since the fluorescent material is fired at the considerably low temperature as indicated above, the fluorescent material emits, when being excited by the low-voltage electron beam, a light having a high brightness (e.g., not less than 50 cd/m²) that is not less than two times higher than that of light emitted by a conventional $CaTiO_3$ fluorescent material that is fired at a higher temperature, e.g., about 1,300° C. In addition, the fluorescent material produced by the present method is less deteriorated than the conventional $SrTiO_3$:Pr, Al fluorescent material.

Preferably, the $CaTiO_3$:Pr,M fluorescent material producing method further comprises a calcinating step of calcinating, before the firing step, the mixture into a calcinated material at a second pre-selected temperature in a range of from 800° C. to 1,000° C. According to this feature, praseodymium Pr as the first additive and the second additive such as aluminum Al can be more uniformly diffused in calcium titanate $CaTiO_3$ as the host crystal. Therefore, the brightness of light can be improved by at least 20% as compared with the case where no calcinating step is carried out. If the distribution of concentration of praseodymium Pr is not uniform, i.e., the concentration of praseodymium Pr is locally too high or too low, the phenomenon of so-called "concentration quenching" may occur to the high concentration portion or portions, and the light emission centers may run short in the low concentration portion or portions. This may lead to lowering the brightness of the light emitted by the fluorescent material and thereby lowering the intensity of the light.

Also, preferably, the $CaTiO_3$:Pr,M fluorescent material producing method further comprises a first milling step of milling the calcinated material into particles having a diameter of about 1 μm, wherein the firing step comprises firing the milled calcinated material, a second milling step of milling the fired material into particles having a diameter of about 3 μm, a sieving step of washing and sieving the milled fired material so as to remove unreacted components, and obtaining the fluorescent material containing a water content, a drying step of drying the obtained fluorescent material so as to remove the water content, and a crushing step of crushing the dried fluorescent material into particles having a diameter of about 3 μm.

Also, preferably, the first-additive raw material comprises praseodymium chloride $PrCl_3$. According to this feature, the fluorescent material producing method produces the $CaTiO_3$:Pr,M fluorescent material that can emit a light having a brightness that is not less than two times higher than that of light emitted by other sorts of $CaTiO_3$:Pr,M fluorescent materials wherein other sorts of praseodymium compounds are used. More specifically described, for example, praseodymium chloride $PrCl_3$, praseodymium carbonate $Pr(CO_3)_3$, praseodymium nitrate $Pr(NO_3)_3$, and praseodymium oxide $Pr_6O_{11}$ are generally used as praseodymium compounds to obtain $CaTiO_3$:Pr,M fluorescent materials. However, when praseodymium chloride $PrCl_3$ is used as the source of praseodymium Pr to obtain a $CaTiO_3$:Pr,M fluorescent material, the thus obtained fluorescent material can emit a light having the highest brightness that is about two times higher than that of light emitted by the fluorescent material obtained using the carbonate or the nitrate, and about ten times higher than that of light emitted by the fluorescent material obtained using the oxide.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Hereinafter, there will be described preferred embodiments of the present invention by reference to the drawings. It is, however, noted that the drawings may be more or less simplified or intentionally distorted and accordingly the dimensional proportions and/or shapes of individual elements and/or portions thereof may not be drawn with accuracy.

Figure 1:
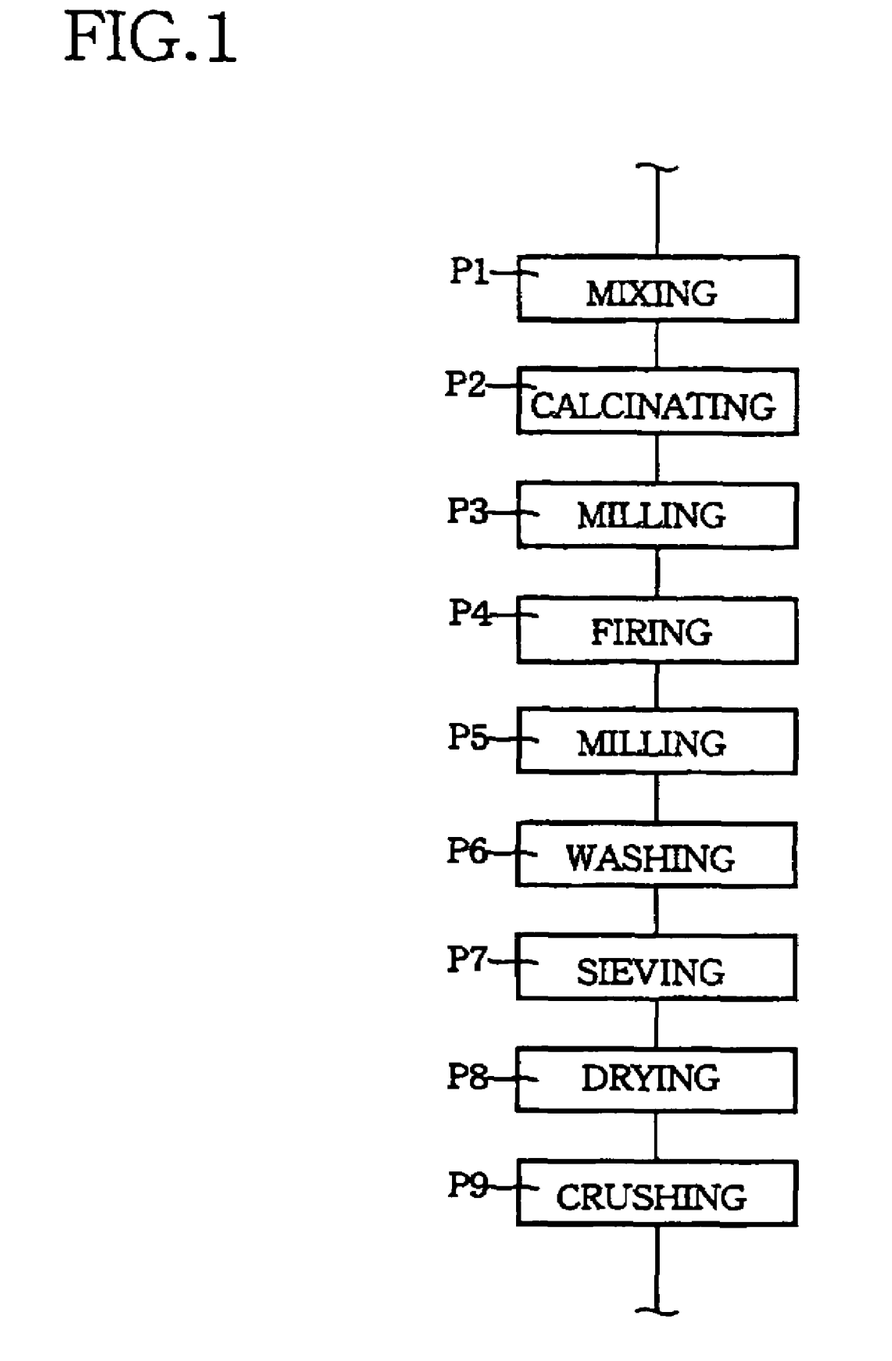
FIG. 1 is a flow chart representing a method of producing a fluorescent material to which the present invention is applied.

FIG. 1 shows a flow chart representing a method of producing a fluorescent material to which the present invention is applied By reference to FIG. 1, there will be described a method of producing a $CaTiO_3$:Pr,Al fluorescent material as an example of the fluorescent material of the present invention. First, in a raw-material mixing step P1, appropriate compounds as start raw materials of this fluorescent material, e.g., calcium carbonate $CaCO_3$, titanium dioxide $TiO_2$, praseodymium chloride $PrCl_3$, and aluminum hydroxide $Al(OH)_3$ are weighed based on a composition of the fluorescent material to be produced, and are adequately mixed with, e.g., a ball mill or a mortar. Mixture ratios are as follows: Ca/Ti=0.99 (molar ratio), the proportion of Pr relative to $CaTiO_3$ is from 0.05 to 0.3 mol %, and the proportion of Al relative to $CaTiO_3$ is from 0 to 0.5 mol %.

Subsequently, in a calcinating step P2, the mixed raw materials (i.e., the mixture) are put in, e.g., a crucible made of alumina having a purity of not less than 99.5%, and is subjected, in, e.g., atmosphere, to a calcinating treatment in which the highest temperature of about 900° C. is kept for about 10 hours. Next, in a first milling step P3, the obtained calcinated material is milled, in, e.g., an alumina mortar, into particles having an average diameter of about 1 μm.

Next, in a firing step P4, the milled calcinated material is put in, e.g., an alumina crucible, and is subjected, in, e.g., atmosphere, to a firing treatment in which the highest temperature of from about 1,050° C. to about 1,150° C. is kept for about 3 hours. As a result, the above-indicated start raw materials react with each other according to the following reaction formula (1), and $CaTiO_3$:Pr,Al as a fluorescent material is synthesized:

$$CaCO_3+TiO_2+PrCl_3+Al(OH)_3, \rightarrow CaTiO_3:Pr,Al \qquad (1)$$

Subsequently, in a second milling step P5, the synthesized fluorescent material is milled, in, e.g., an alumina mortar, into particles having an average diameter of about 3 μm.

Next, in a washing step P6, the milled particles of the fluorescent material are dispersed in water so as to dissolve water soluble residual materials. The praseodymium chloride $PrCl_3$ as one of the above-indicated start raw materials is soluble in water, whereas the synthesized fluorescent material and the other raw materials are not soluble in water. Thus, only the unreacted praseodymium chloride $PrCl_3$ is dissolved in the water.

Subsequently, in a sieving step P7, the fluorescent material dispersed in the water is sieved with, e.g., a #300 sieve so as to remove the large particles, and then the sieved dispersion is kept still for an appropriate time so as to cause the small particles of the fluorescent material to precipitate. After that time, the supernatant liquid is removed by suction using, e.g., a pipette. Thus, the water soluble residual material contained in the supernatant liquid (i.e., the water soluble component of the raw materials) is removed. The steps P6, P7 may be repeated a plurality of times, as needed, so as to remove completely the water soluble residual materials. Next, in a drying step P8, the particles of the fluorescent material remaining after the removal of the supernatant liquid is dried at a temperature of, e.g., about 120° C. for about 5 hours. Subsequently, in a crushing step P9, the thus obtained solid material is crushed in, e.g., an alumina mortar into particles having a diameter of about 3 μm. Thus, the powder of the $CaTiO_3$:Pr,Al fluorescent material is obtained.

Next, the results of evaluation of characteristics of the fluorescent material produced by the above-described method will be explained. To this end, the powder of fluorescent material is mixed with an appropriate amount of powder of indium oxide $In_2O_3$ for the purpose of increasing the electric conductivity of the powder of fluorescent material, and is additionally mixed with an organic binder and a vehicle such as an organic solvent, so as to prepare a paste of the fluorescent material The amount of the powder of indium oxide $In_2O_3$ mixed is appropriately determined based on the electric conductivity of the powder of fluorescent material per se and a required electric conductivity of a layer formed of the fluorescent material. For example, from about 5% by weight, to about 15% by weight, of the powder of indium oxide $In_2O_3$ is mixed with 100% by weight of the powder of fluorescent material. The thus prepared paste of the fluorescent material is applied to, e.g., a display surface of a display device, so that a layer of the fluorescent material is formed with an appropriate thickness. The thus formed layer of the fluorescent material was evaluated. More specifically explained, a vacuum fluorescent display 10 having a construction shown in FIGS. 2, 3, and 4 was evaluated.

Figure 2:
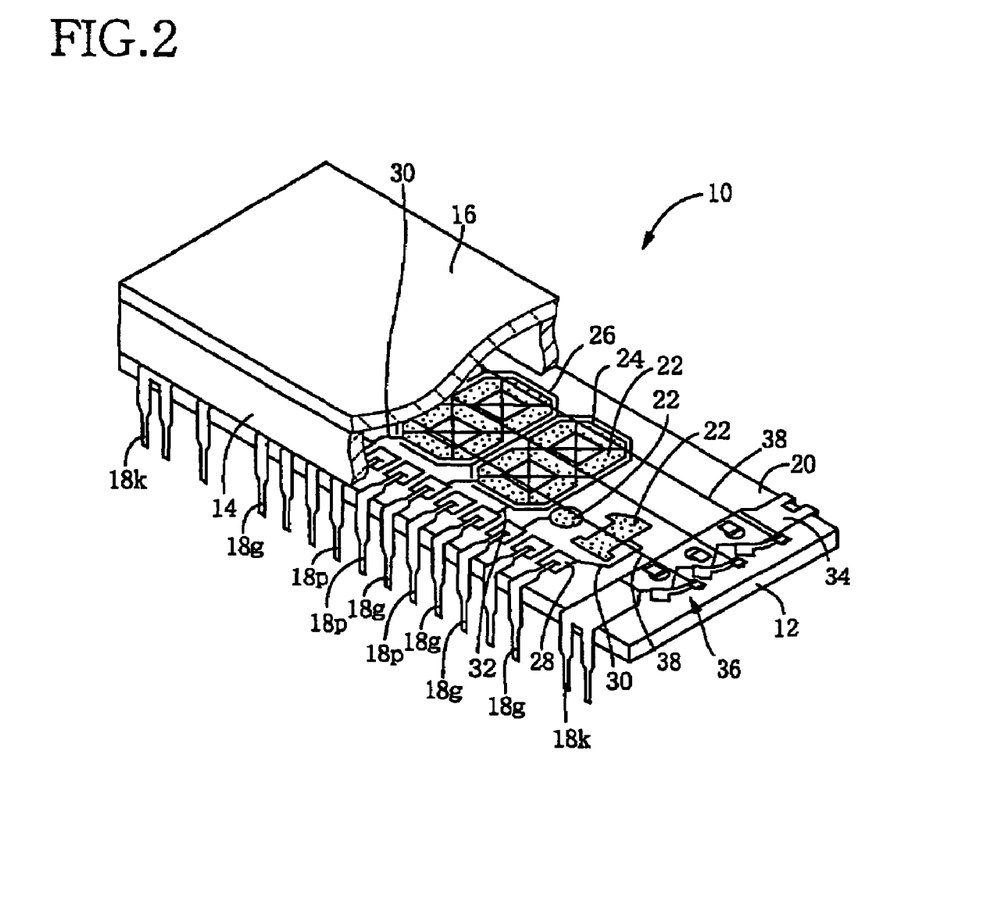
FIG. 2 is a partly cut away view of an overall construction of a vacuum fluorescent display as an example of a fluorescent display apparatus to which the present invention is also applied.

FIG. 2 shows the vacuum fluorescent display 10 as an example of a fluorescent display apparatus to which the present invention is also applied. In the figure, the vacuum fluorescent display 10 includes a base plate 12 provided with a fluorescent-material layer 22; a frame-like glass spacer 14; a transparent glass cover plate 16; a plurality of anode terminals 18p; a plurality of grid terminals 18g; and two cathode terminals 18k. The fluorescent-material layer 22 includes a plurality of fluorescent patterns located at a plurality of places, respectively. The base plate 12 is made of an electrically insulating material such as glass, ceramic, or porcelain enamel. The base plate 12 and the glass cover plate 16 are sealed with each other via the glass spacer 14 so as to provide an elongate, flat, box-like, gas-tight container having a vacuum space therein.

The base substrate 12 has a display surface 20 that has, thereon, the fluorescent-material layer 22 defining the various fluorescent patterns each of which is surrounded by a grid electrode 24 and an auxiliary electrode 26. The auxiliary electrode 26 is electrically insulated from the grid electrodes 24 and is common to all the fluorescent patterns. The grid electrodes 24 and the auxiliary grid electrode 26 are connected to the grid terminals 18g via grid wires 30, 32, respectively, provided on the display surface 20, and respective terminal pads 28 provided along a long side of the surface 20.

On lengthwise opposite end portions of the base surface 12, there are fixed two terminal members 34 (only one terminal member 34 is shown in FIG. 2) each of which includes a corresponding one of the above-described two cathode terminals 18k and additionally includes a fixed anchor 36 that cooperates with a support member, not shown, to support a plurality of thin filaments (i.e., a filament cathode) 38 functioning as a directly heated cathode such that the thin filaments 38 are strung, parallel to a lengthwise direction of the base plate 12, at a predetermined height position spaced upward from the display surface 20, i.e., the fluorescent-material layer 22. Each of the filaments 38 is constituted by, e.g., a tungsten (W) wire whose surface is coated with an electron emitting layer, e.g., a solid solution of an oxide of an alkaline earth metal whose work function is low, such as BaO, SrO, CaO. The vacuum fluorescent display 10 is provided with a getter, not shown, that is for increasing the degree of vacuum of the inner space of the gas-tight container, and a gas exhausting tube or hole, not shown, that is for exhausting gas from the inner space of the container and thereby rendering the inner space vacuum.

Figure 3:
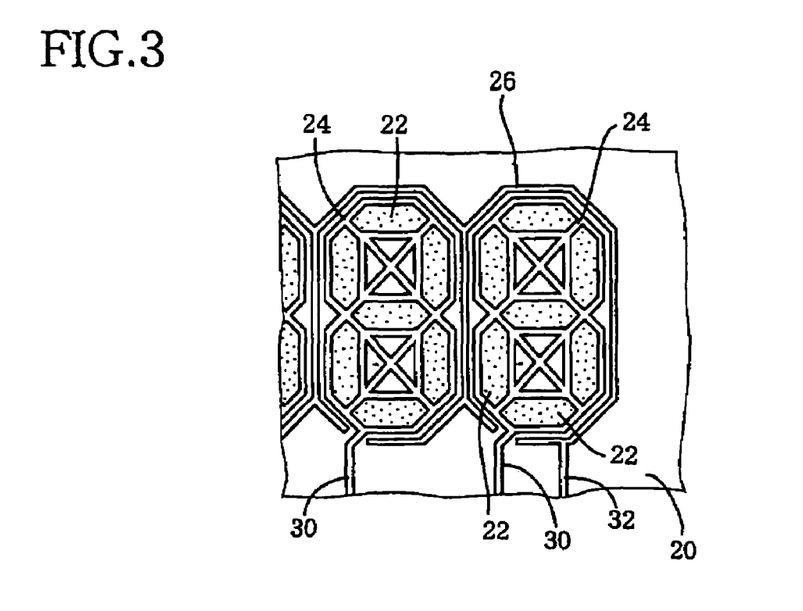
FIG. 3 is an enlarged plan view of a portion of a display surface of the vacuum fluorescent display, showing a layer of the fluorescent material.
Figure 4:
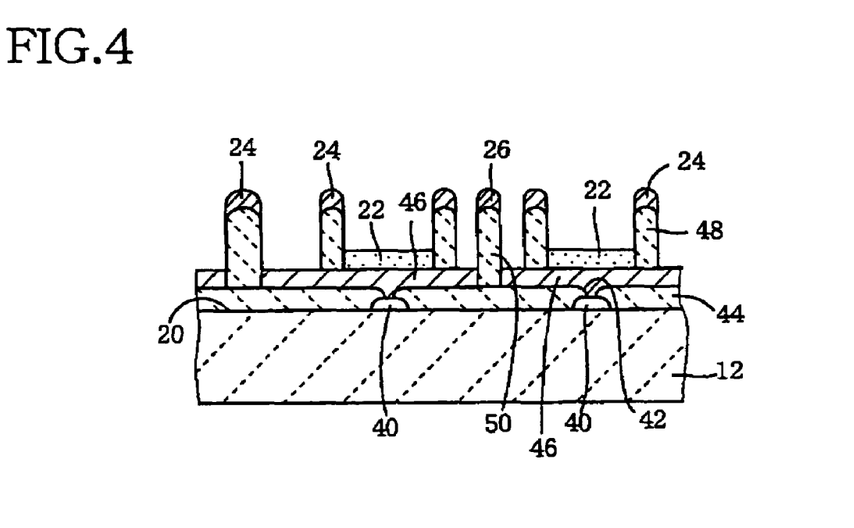
FIG. 4 is an enlarged cross-section view of a portion of the vacuum fluorescent display, showing a construction of the display.

FIG. 3 shows, in enlargement, a portion of the display surface 20, and FIG. 4 shows, in enlargement, a cross section of a portion of the base plate 12. On the display surface 20, there are provided a plurality of anode wires 40 each of which is constituted by, e.g., an electrically conductive thick film and is connected to a corresponding one of the anode terminals 18p. On the anode wires 40, there is fixed an electrically insulating layer 44 that is constituted by a glass thick film and has a plurality of through-holes 42 at respective appropriate positions. On the insulating layer 44, there are provided a plurality of anodes 46 each of which is constituted by, e.g., a graphite sheet or film whose size is somewhat larger than a corresponding one of the fluorescent patterns of the fluorescent-material layer 22. The anodes 46 are electrically connected to the corresponding anode wires 40 via the corresponding through-holes 42 of the insulating layer 44. On the anodes 46, there is formed the fluorescent-material layer 22. Each of the fluorescent patterns of the fluorescent-material layer 22 is surrounded by rib-like walls 48, 50 each of which is constituted by, e.g., a glass thick film. Each of the above-described grid electrodes 24 and the auxiliary grid electrode 26 is constituted by, e.g., an electrically conductive thick film, and is provided on the top of a corresponding one of the rib-like walls 48, 50.

In the vacuum fluorescent display 10 constructed as described above, thermoelectrons emitted by the filament cathode 38 at 0 V are accelerated by the grid electrodes 24 to which a positive voltage of, e.g., 20 V is applied. Therefore, for example, in the case where the accelerating voltage is sequentially applied to the grid electrodes 24, i.e., "scans" the same 24 and concurrently a positive voltage is selectively applied to respective anode wires 40 connected to desired ones of the fluorescent patterns of the fluorescent-material layer 22, in synchronism with the scanning of the grid electrodes 24, the thermoelectrons collide with the desired fluorescent patterns so that those fluorescent patterns emit light. If the anode wires 40 to which the positive voltage is selectively applied are changed each time the grid electrodes 24 are scanned, desired fluorescent display images can be continuously obtained. However, the evaluation of the fluorescent material was carried out in such a manner that under the condition that the positive voltage is constantly applied to the fluorescent patterns of the fluorescent-material layer 22 and accordingly the fluorescent patterns continuously emit light, a brightness of the light is measured.

Figure 5:
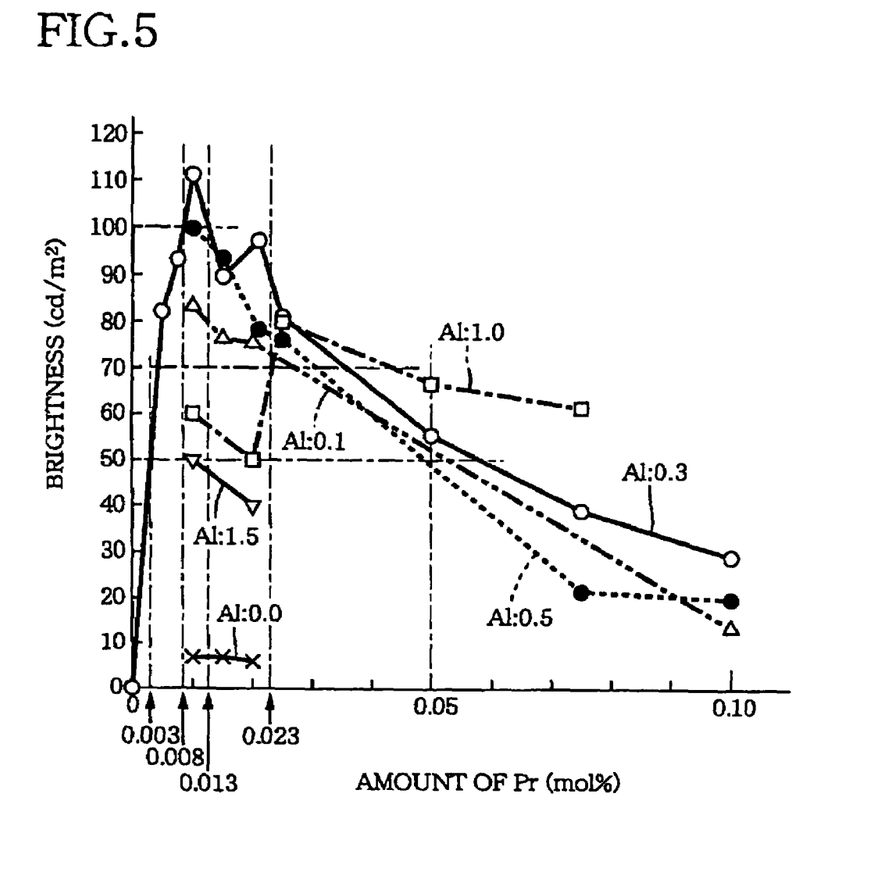
FIG. 5 is a graph showing a relationship between amount of aluminum Al and brightness that is obtained from the fluorescent material.

FIG. 5 shows results of evaluation of compositions of the fluorescent material wherein the amount of praseodymium Pr added to 100 mol % of calcium titanate $CaTiO_3$ was changed from 0 mol % to 0.10 mol % and the amount of aluminum Al added to the 100 mol % of calcium titanate $CaTiO_3$ was changed from 0 mol % to 1.5 mol %. Under the conditions that the vacuum fluorescent display 10 was excited at an electric voltage of 26 V and was operated at a duty cycle of 1/12, an initial brightness of a red light having a wavelength of about 614 nm that is a peak wavelength of the fluorescent material was measured. As shown in FIG. 5, in the case where the amount of aluminum Al added is 0 mol % or 1.5 mol %, a high brightness of not less than 50 $cd/m_2$ could not be obtained over an entire range of the amount of praseodymium Pr added. However, in the case where the amount of aluminum Al added is changed in the range of from 0.1 mol % to 1.0 mol %, the high brightness of not less than 50 $cd/m_2$ could be obtained over an entire range of the amount of praseodymium Pr from 0.003 mol % to 0.05 mol %. In particular, in the case where the amount of praseodymium Pr added is changed in a range of from 0.008 mol % to 0.023 mol %, the fluorescent material emits a light having a higher brightness of not less than 70 cd/m$^2$ that can be adequately observed with naked eyes of a human being.

In a range over 0.02 mol % of praseodymium Pr, it appears that there is a tendency that the brightness gradually decreases as the amount of praseodymium Pr added increases. In particular, in a range over 0.1 mol % of praseodymium Pr that is not shown in FIG. 5 but can be easily speculated from the figure, the brightness remains significantly low, i.e., not higher than 20 cd/m$^2$. Thus, it can be understood that the high brightness cannot be obtained if the concentration of praseodymium Pr added is too low or too high.

In addition, as shown in FIG. 5, in the case where the amount of praseodymium Pr added is changed from 0.005 mol % to 0.05 mol %, the high brightness of not less than 50 cd/m$^2$ could be obtained if the amount of aluminum Al added is changed in the range of from 0.1 mol % to 1.0 mol %. In particular, in the case where the amount of aluminum Al is about 0.3 mol %, a brightness of not less than 100 cd/m$^2$ that is comparable to a conventional sulfide fluorescent material can be obtained.

Moreover, regarding this fluorescent material, a half life expectancy, i.e., a time duration needed for the brightness to decrease by half the initial brightness was measured under the same conditions as indicated above, i.e., conditions that the vacuum fluorescent display 10 was excited at the electric voltage of 26 V and was operated at the duty cycle of 1/12. The results of measurements indicate that all the compositions of the fluorescent material that show the high brightness exhibit a more than 1,000 hour half life expectancy that is much longer than a less than 100 hour half life expectancy of SrTiO$_3$ fluorescent materials.

In short, the present fluorescent material, i.e., the CaTiO$_3$:Pr,Al fluorescent material contains calcium titanate CaTiO$_3$ as a host crystal, from 0.003 mol % to 0.05 mol % of praseodymium Pr added as an activator, and aluminum Al as an additive. Thus, the present fluorescent material enjoys a longer life expectancy than those of the SrTiO$_3$ fluorescent materials and, in the case where the present fluorescent material is excited by a low-voltage electron beam, a high brightness that can be adequately observed with naked eyes can be obtained.

Figure 6:
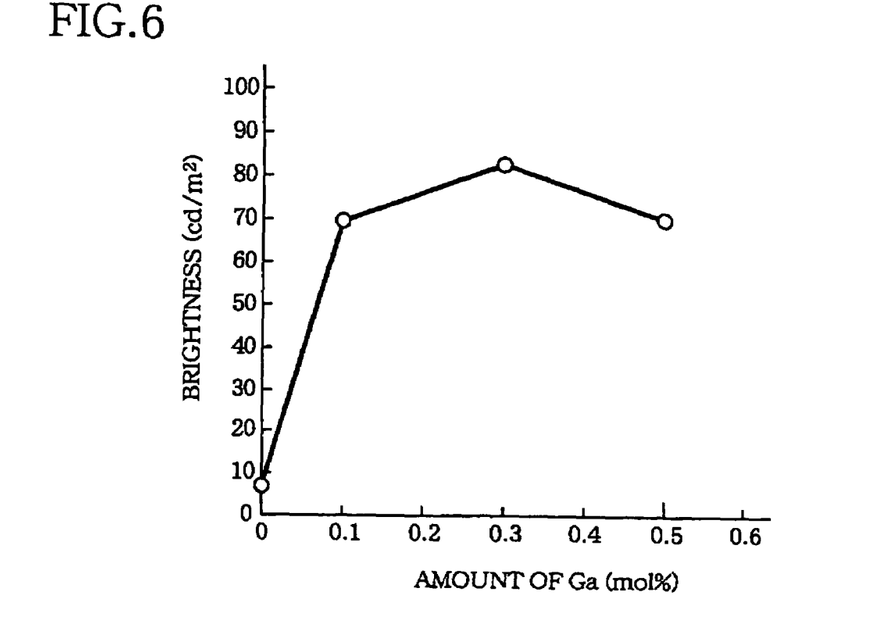
FIG. 6 is a graph showing a relationship between amount of gallium Ga and brightness that is obtained from another fluorescent material as another embodiment of the present invention.

FIG. 6 shows results of measurement of initial brightness of CaTiO$_3$:Pr,Ga fluorescent material wherein aluminum Al is replaced with from 0.1 mol % to 0.5 mol % of gallium Ga. The CaTiO$_3$:Pr,Ga fluorescent material contains 0.01 mol % of praseodymium Pr. As is apparent from FIG. 6, if the amount of gallium Ga added is not less than 0.07 mol % as a lower limit, a sufficiently high brightness of not less than 50 cd/m$^2$ can be obtained. However, an upper limit of an appropriate range of gallium Ga added could not be elucidated by this experiment. It is expected that even in a range over 0.5 mol % of gallium Ga, the CaTiO$_3$:Pr,Ga fluorescent material will exhibit a brightness that is comparable to, or higher than, the above-indicated high brightness.

Figure 7:
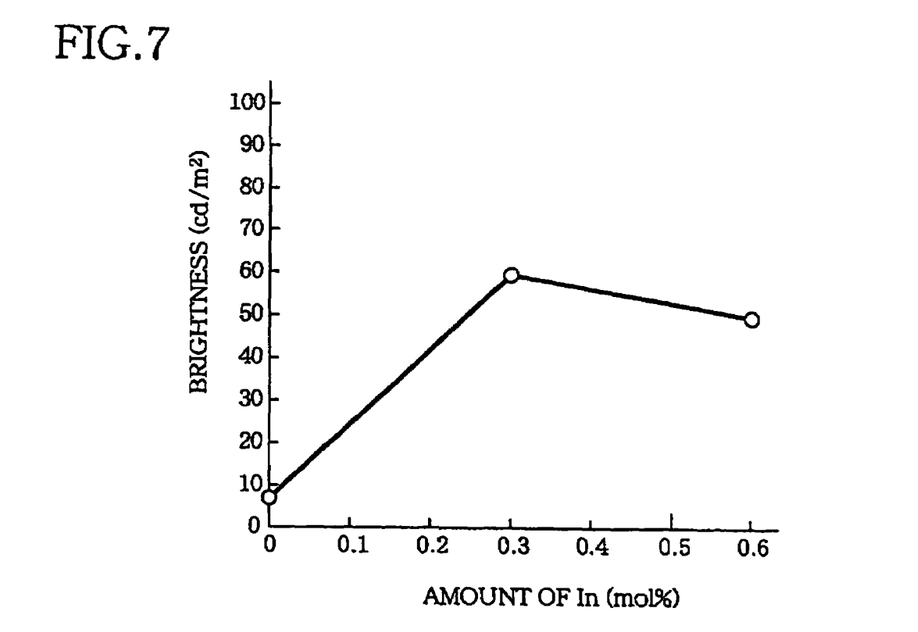
FIG. 7 is a graph showing a relationship between amount of indium In and brightness that is obtained from another fluorescent material as another embodiment of the present invention.

FIG. 7 shows results of measurement of initial brightness of CaTiO$_3$:Pr,In fluorescent material wherein aluminum Al is replaced with from 0.3 mol % to 0.6 mol % of indium In. The CaTiO$_3$:Pr,In fluorescent material contains 0.01 mol % of praseodymium Pr. In FIG. 7, if a data point corresponding to 0 mol % of indium In and the other two data points corresponding to 0.3 mol % and 0.6 mol % of indium In added are compared with each other, it is apparent that the brightness is increased by the addition of indium In. It is expected that the high brightness of not less than 50 cd/m$^2$ will be obtained if the amount of indium In added is not less than 0.2 mol %. However, neither an upper nor a lower limit of an appropriate range of indium In could be elucidated by this experiment. Like gallium Ga, it is expected that even in a range over 0.6 mol % of indium In, the CaTiO$_3$:Pr,In fluorescent material will exhibit a still higher brightness.

Figure 8:
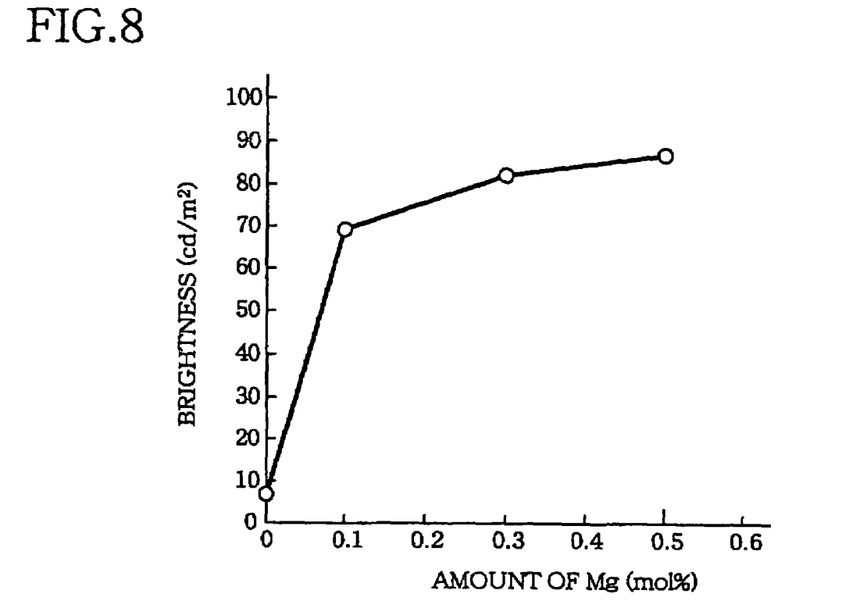
FIG. 8 is a graph showing a relationship between amount of magnesium Ma and brightness that is obtained from another fluorescent material as another embodiment of the present invention.

FIG. 8 shows results of measurement of initial brightness of CaTiO$_3$:Pr,Mg fluorescent material wherein aluminum Al is replaced with from 0.1 mol % to 0.5 mol % of magnesium Mg. The CaTiO$_3$:Pr,Mg fluorescent material contains 0.01 mol % of praseodymium Pr. This fluorescent material was synthesized by using magnesium nitrate Mg(NO$_3$)$_2$ as a source of magnesium Mg. As is apparent from FIG. 8, if the amount of magnesium Mg added is not less than 0.07 mol % as a lower limit, a sufficiently high brightness of not less than 50 cd/m$^2$ can be obtained. However, an upper limit of an appropriate range of magnesium Mg could not be elucidated by this experiment. It is expected that even in a range over 0.5 mol % of magnesium Mg, the CaTiO$_3$:Pr,Mg fluorescent material will exhibit a still higher characteristic, because the brightness increases as the amount of magnesium Mg added increases in the graph of FIG. 8.

Figure 9:
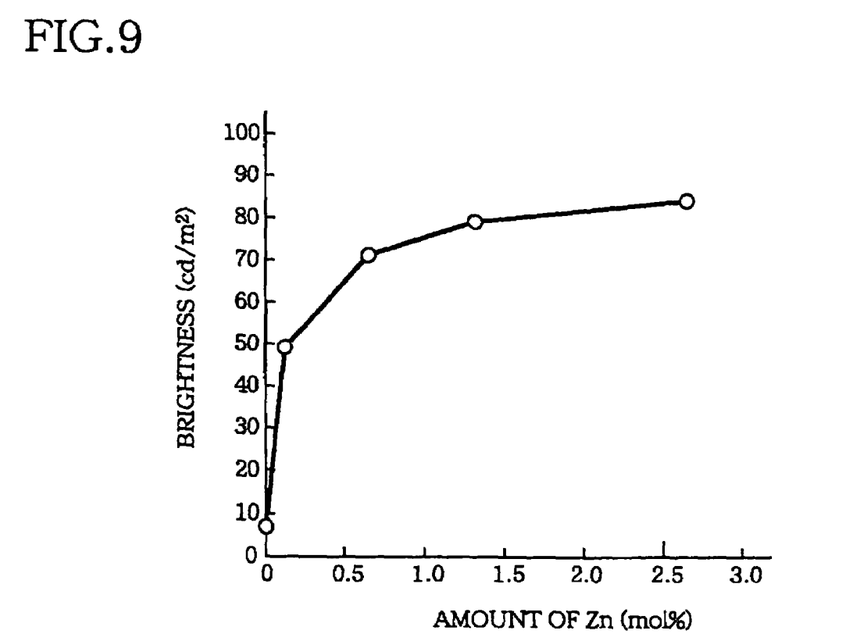
FIG. 9 is a graph showing a relationship between amount of zinc Zn and brightness that is obtained from another fluorescent material as another embodiment of the present invention.

FIG. 9 shows results of measurement of initial brightness of CaTiO$_3$:Pr,Zn fluorescent material wherein aluminum Al is replaced with from 0.13 mol % to 2.65 mol % of zinc Zn. The CaTiO$_3$:Pr,Zn fluorescent material contains 0.01 mol % of praseodymium Pr. This fluorescent material was synthesized by using zinc nitrate Zn(NO$_3$)$_2$ as a source of zinc Zn. As is apparent from FIG. 9, if the amount of zinc Zn added is not less than 0.13 mol % as a lower limit, a sufficiently high brightness of not less than 50 cd/m$^2$ can be obtained. However, an upper limit of an appropriate range of zinc Zn could not be elucidated by this experiment. It is expected that even in a range over 2.66 mol % of zinc Zn, the CaTiO$_3$:Pr,Zn fluorescent material will exhibit a still higher characteristic, because the brightness increases as the amount of zinc Zn added increases in the graph of FIG. 9.

In addition, another fluorescent material wherein aluminum Al is replaced with zinc Zn and lithium Li was evaluated, although results of measurements of initial brightness thereof are not shown in the figures. In the case where 2.65 mol % of zinc Zn and 0.5 mol % of lithium Li are added, the fluorescent material exhibits a very high brightness of about 131 cd/m$^2$, as compared with the case where only the 2.65 mol % of zinc Zn is added. In this embodiment, it can be said that praseodymium Pr is a first additive, zinc Zn is a second additive, and lithium Li is a third additive.

Figure 10:
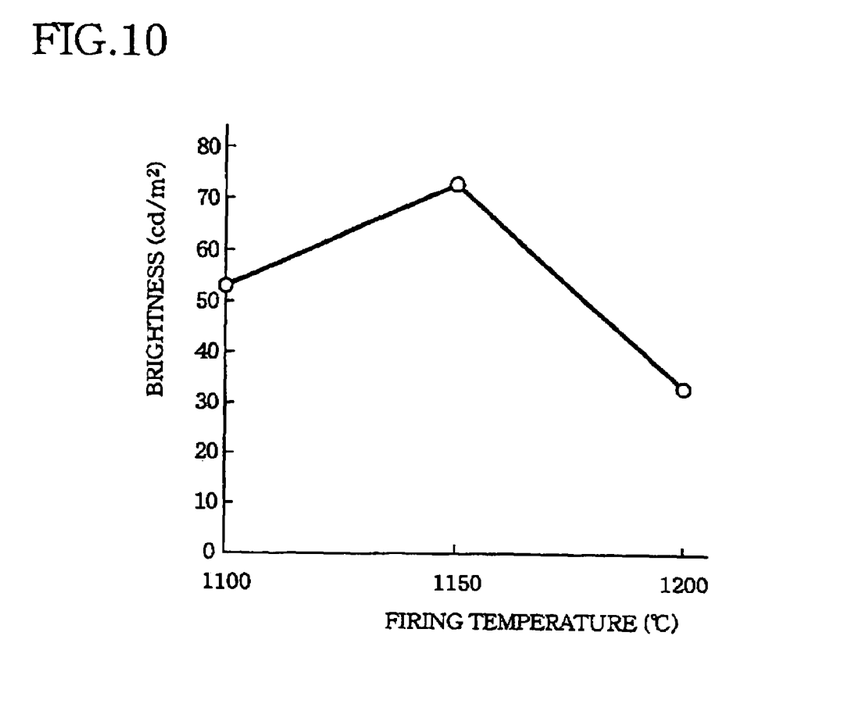
FIG. 10 a graph showing a relationship between firing temperature and brightness that is obtained from another fluorescent material as another embodiment of the present invention.

FIG. 10 shows a relationship between firing temperature and brightness that is obtained from CaTiO$_3$:Pr,Li fluorescent material wherein aluminum Al is replaced with lithium Li. The CaTiO$_3$:Pr,Li fluorescent material contains 0.01 mol % of praseodymium Pr. This fluorescent material was synthesized by using, as a source of lithium Li, lithium carbonate Li$_2$CO$_3$ in the amount of 0.5 mol % relative to 100 mol % of calcium titanate CaTiO$_3$. As is apparent from FIG. 10, if the firing temperature is 1,200° C., the brightness remains at 30 cd/m$^2$. However, if the firing temperature is 1,150° C. sufficiently lower than 1,200° C., the brightness increases up to 70 cd/m$^2$ that is more than two times higher than 30 cd/m$^2$; and even if the firing temperature is 1,000° C., a high brightness of not less than 50 cd/m$^2$ is obtained.

In the case where the above-indicated optimum firing condition is applied to the CaTiO$_3$:Pr,Li fluorescent material wherein lithium Li is added, a very high brightness of about 160 cd/m$^2$ was obtained from a fluorescent material containing 2 mol % of lithium Li; a very high brightness of about 130 cd/m$^2$ was obtained from a fluorescent material containing 3 mol % of lithium Li; and a very high brightness of about 100 cd/m$^2$ was obtained from a fluorescent material containing 6 mol % of lithium Li. Each of those fluorescent materials showed a relationship between firing temperature and brightness, not shown, that was similar to the relationship shown in FIG. 10.

In short, in the present embodiment, the host-crystal raw material, the source of praseodymium Pr, and the source of lithium Li are mixed with each other in the mixing step P1; and, in the firing step P4, the thus obtained mixture is fired at the temperature in the range of from 1,050° C. to 1,150° C. The thus obtained CaTiO$_3$:Pr,Li oxide fluorescent material has a longer life expectancy than that of the SrTiO$_3$:Pr,Al fluorescent material and, even if the CaTiO$_3$:Pr,Li fluorescent material is excited by a low-voltage electron beam, it can emit a light having a high brightness. Regarding each of the other second additives (i.e., aluminum Al, gallium Ga, indium In, magnesium Mg, zinc Zn) than lithium Li, the measurement results, shown in FIGS. 5 through 9, were obtained from the respective fluorescent materials that were fired at the temperature in the range of from 1,050° C. to 1,150° C. that can be thought to be optimum to them.

Figure 11:
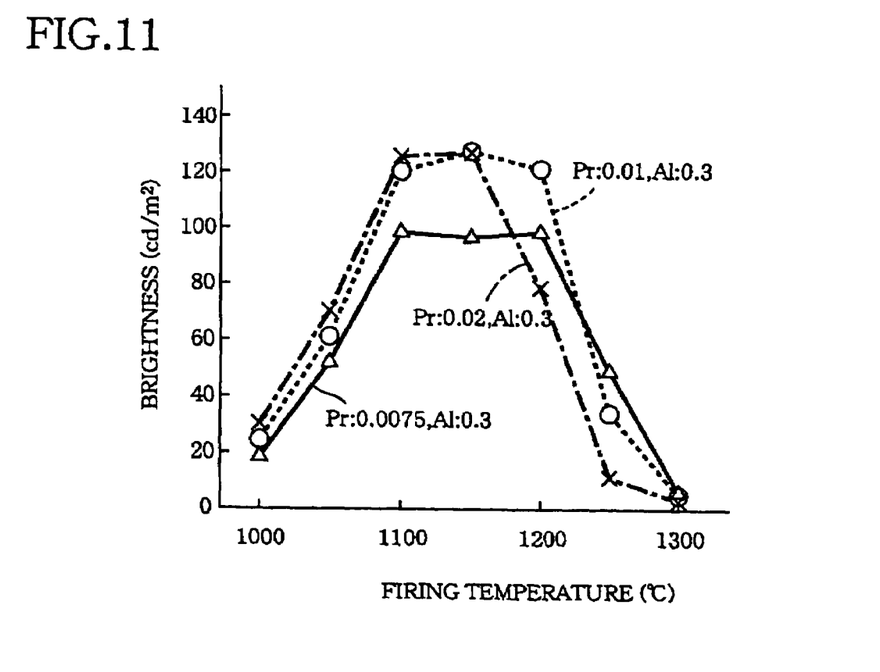
FIG. 11 a graph showing a relationship between firing temperature and brightness that is obtained from another fluorescent material as another embodiment of the present invention.

FIG. 11 shows relationships between firing temperature and brightness that correspond to the relationship shown in FIG. 10 and are obtained from CaTiO$_3$:Pr,Al fluorescent materials. These CaTiO$_3$:Pr,Al fluorescent materials contain 0.3 mol % of aluminum Al, and respective different addition amounts of praseodymium Pr, i.e., 0.0075 mol %, 0.01 mol %, and 0.02 mol %. FIG. 11 indicates that although the relationships more or less differ from each other depending upon the addition amounts of praseodymium Pr, the brightness of the fluorescent material fired at 1,300° C. remains at about 5 cd/m$^2$, whereas the brightness of the fluorescent material fired at 1,250° C. sufficiently lower than 1,300° C. significantly increases. For example, the brightness of light emitted by the fluorescent material containing 0.0075 mol % of praseodymium Pr and fired at 1,250° C. is about 50 cd/m$^2$ that is about ten times the brightness of the fluorescent material fired at 1,300° C. In addition, if the firing temperature is 1,200° C., the brightness of the fluorescent material containing 0.02 mol % of praseodymium Pr is about 80 cd/m$^2$, the brightness of the fluorescent material containing 0.01 mol % of praseodymium Pr is about 100 cd/m$^2$, and the brightness of the fluorescent material containing 0.0075 mol % of praseodymium Pr is about 120 cd/m$^2$.

In particular, when the firing temperature falls in the range of from 1,100° C. to 1,150° C., a brightness of not lower than 120 cd/m$^2$ is obtained with respect to the fluorescent material containing 0.01 mol % or 0.02 mol % of praseodymium Pr; and a brightness of not lower than 90 cd/m$^2$ is obtained with respect to even the fluorescent material containing 0.0075 mol % of praseodymium Pr.

However, if the firing temperature is too low, a high brightness cannot be obtained. For example, if the firing temperature is 1,000° C., the brightness remains not more than about 30 cd/m$^2$. However, when the firing temperature is 1,050° C., a brightness of not less than 50 cd/m$^2$ is obtained with respect to each of the three compositions shown in FIG. 11. A similar tendency, not shown, can be observed with respect to other fluorescent materials containing the other elements or additives, although obtained data more or less differ from each other depending upon the sorts of additives. From those data, it is apparent that the firing temperature preferably falls in the range of from 1,050° C. to 1,250° C. In particular, when the firing temperature falls in the range of from 1,100° C. to 1,150° C., a very high brightness of not les than 100 cd/m$^2$ is advantageously obtained. Above all, with respect to the fluorescent material containing 0.01 mol % or 0.02 mol % of praseodymium Pr, when the firing temperature falls in the range of from 1,100° C. to 1,200° C., the very high brightness is advantageously obtained.

Figure 12:
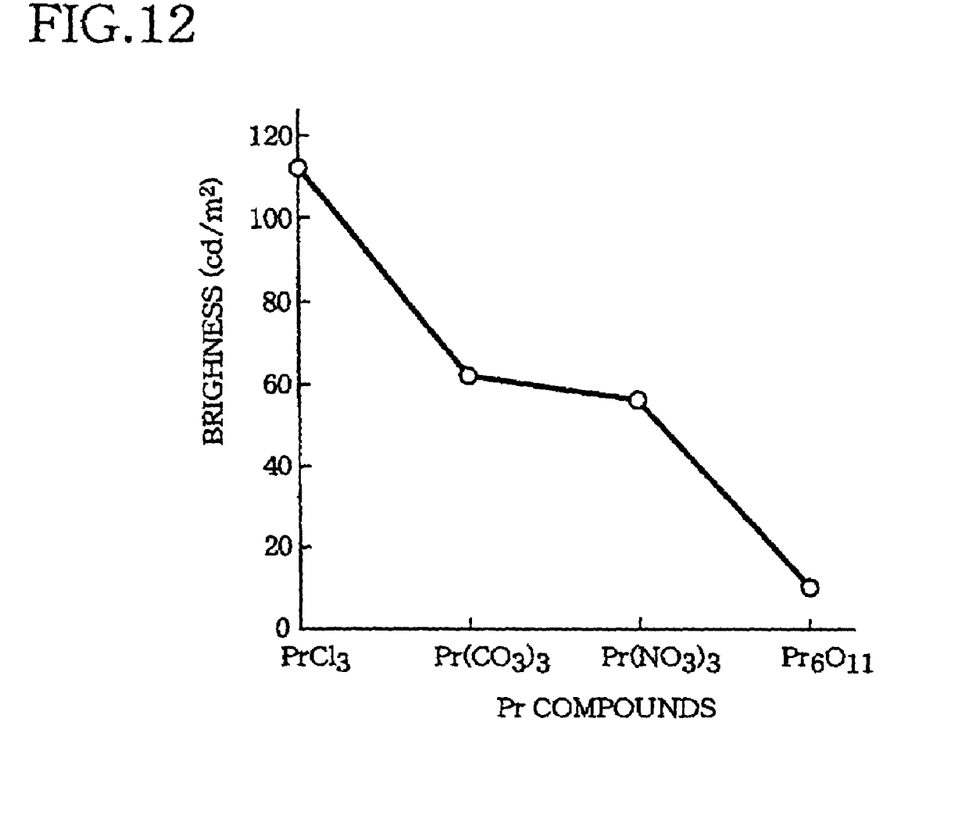
FIG. 12 a graph showing a relationship between various compounds of praseodymium Pr and brightness that is obtained from various fluorescent materials including another fluorescent material as another embodiment of the present invention.

FIG. 12 shows a relationship between various praseodymium compounds each as the source of praseodymium Pr and brightness that is obtained from various CaTiO$_3$:Pr,Al fluorescent materials that are synthesized using the respective praseodymium compounds. Each of the CaTiO$_3$:Pr,Al fluorescent material contains 0.01 mol % of praseodymium Pr and 0.3 mol % of aluminum Al. As is apparent from the evaluation results shown in FIG. 12, a high initial brightness of not less than 100 cd/m$^2$ can be obtained from the fluorescent material containing the chloride (e.g., praseodymium chloride PrCl$_3$), whereas the brightness of the fluorescent material containing the carbonate (e.g., praseodymium carbonate Pr(CO$_3$)$_3$) or the nitrate (e.g., praseodymium nitrate Pr(NO$_3$)$_3$) remains at about 60 cd/m$^2$ and the brightness of the fluorescent material containing the oxide (e.g., praseodymium oxide Pr$_6$O$_{11}$) remains very low, i.e., about 10 cd/m$^2$. Thus, it can be understood that the source of praseodymium Pr be preferably selected from not the oxides thereof but the chlorides thereof.

While the present invention has been described in its preferred embodiments by reference to the drawings, it is to be understood that the present invention may be embodied with other changes, modifications, and improvements that may occur to a person skilled in the art, without departing from the scope of the invention.

What is claimed is:

1. A CaTiO$_3$:Pr, M fluorescent material for a vacuum fluorescent display comprising:
    100-mol % of calcium titanate CaTiO$_3$ as a host crystal;
    from 0.008 mol % to 0.023 mol % of praseodymium Pr which is added, as a first additive, to the host crystal;
    at least one of zinc Zn and magnesium Mg which is added, as a second additive M, to the host crystal; and
    lithium Li which is added, as a third additive, wherein the fluorescent material is excited by a low-voltage electron beam by electric voltage of from 10 V to 100 V.

2. The CaTiO$_3$:Pr, M fluorescent material for a vacuum fluorescent display according to claim 1, wherein the second additive includes not less than 0.13 mol % of zinc Zn relative to 100 mol % of the host crystal.

3. The CaTiO$_3$:Pr, M fluorescent material for a vacuum fluorescent display according to claim 1, wherein the second additive includes not less than 0.07 mol % of magnesium Mg relative to 100 mol % of the host crystal.

4. The CaTiO$_3$:Pr, M fluorescent material for a vacuum fluorescent display according to claim 1, wherein lithium Li is added not less than 0.5 mol % to 100 mol % of the host crystal.

5. The CaTiO$_3$:Pr, M fluorescent material for a vacuum fluorescent display according to claim 1, comprising a plurality of said second additives M which are selected from the group consisting of zinc Zn, and magnesium Mg which are added together to the host crystal.

6. A method of producing the CaTiO$_3$:Pr, M fluorescent material comprising 100 mol % of calcium titanate CaTiO$_3$ as a host crystal; from 0.003 mol % to 0.05 mol % of praseodymium Pr which is added, as a first additive, to the host crystal; and at least one of aluminum Al, gallium Ga, indium In, zinc Zn, magnesium Mg, sodium Na, and potassium K which is added, as a second additive M, to the host crystal, the method comprising:
    mixing (a) a host-crystal raw material for providing the calcium titanate CaTiO$_3$ as the host crystal, (b) a first-additive raw material including praseodymium Pr, and (c) at least one second-additive raw material including said at least one of aluminum Al, gallium Ga, indium In, zinc Zn, magnesium Mg, sodium Na, and potassium K, with each other, into a mixture, calcinating the mixture into a calcinated material at a second pre-selected temperature in a range of from 800° C. to 1,000° C.; and a firing, after the calcinating step, the mixture at a first pre-selected temperature in a range of from 1,050° C. to 1,250° C.

7. The method according to claim 6, further comprising:

milling the calcinated material into particles having a diameter of about 1 μm, wherein the firing step comprises firing the milled calcinated material, milling the fired material into particles having a diameter of about 3 μm, washing and sieving the milled fired material so as to remove unreacted components therefrom, and obtaining the fluorescent material containing a water content, drying the obtained fluorescent material so as to remove the water content, and crushing the dried fluorescent material into particles having a diameter of about 3 μm.

8. The method according to claim 6, wherein the first-additive raw material comprises praseodymium chloride $PrCl_3$.

9. The method according to claim 6, wherein the first pre-selected temperature in the firing step is in a range of from 1,050° C. to 1,200° C.

10. The method according to claim 8, wherein the first pre-selected temperature in the firing step is in a range of from 1,100° C. to 1,150° C.

* * * * *